United States Patent
Beale et al.

(10) Patent No.: US 6,947,480 B2
(45) Date of Patent: Sep. 20, 2005

(54) NETWORKING

(75) Inventors: Martin Warwick Beale, Bristol (GB); Timothy Alan Heath Wilkinson, Bristol (GB); Ian Robert Johnson, Bristol (GB); Robert John Castle, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 550 days.

(21) Appl. No.: 10/030,041
(22) PCT Filed: Apr. 30, 2001
(86) PCT No.: PCT/GB01/01876
§ 371 (c)(1), (2), (4) Date: Jan. 7, 2002
(87) PCT Pub. No.: WO01/86900
PCT Pub. Date: Nov. 5, 2001

(65) Prior Publication Data
US 2003/0048839 A1 Mar. 13, 2003

(30) Foreign Application Priority Data
May 8, 2000 (EP) .......................................... 00303863

(51) Int. Cl.$^7$ ................................................ H03H 7/30
(52) U.S. Cl. ...................................... 375/229; 375/231
(58) Field of Search .............................. 375/229, 231; 708/322, 323; 333/28 R

(56) References Cited

U.S. PATENT DOCUMENTS

| 5,268,930 A | * | 12/1993 | Sendyk et al. ............. 375/231 |
| 5,297,169 A | * | 3/1994 | Backstrom et al. ......... 375/231 |
| 5,475,710 A | * | 12/1995 | Ishizu et al. ................ 375/232 |

FOREIGN PATENT DOCUMENTS

| EP | 0 154 565 | 9/1985 |
| GB | 2 258 120 | 1/1993 |

OTHER PUBLICATIONS

Frank et al., "Connecting the Home with a Phone Line Network Chip Set", IEEE MICRO, 2000, pp. 27–38, vol. 20, No. 2, XP–002162052.

* cited by examiner

Primary Examiner—Khai Tran
(74) Attorney, Agent, or Firm—Foley & Lardner LLP

(57) ABSTRACT

A network adapter capable of receiving data from a network, said adapter arranged to receive data at at least a lowest and a highest rate; said adapter comprising: sampling means arranged to sample said data; an equalizer arranged to receive, and equalize, said data samples, and said equalizer capable of being trained to equalize data at, at least, each of said lowest and highest data rates; and training means capable of training said equalizer to equalize data; wherein; said adapter is initially arranged to train said equalizer to receive data at said lowest data rate allowing data to be decoded and if upon decoding said adapter determines that said equalizer has been trained to equalise data at the incorrect rate to retrain said equalize to equalize data at the correct rate.

35 Claims, 3 Drawing Sheets

NETWORKING

This invention relates to improvements in networking and in particular but not exclusively to an improved network adapter and a method of using a network.

This invention will be described in relation to a network using internal telephone wiring as specified in the home phone network alliance (HPNA) specification, but has wider application and is not limited to this field. In particular it is envisaged that the HPNA 2.0 specification will be used.

The HPNA specification allows data be transmitted as a series of symbols at varying data, or baud, rates. During transmission along the transmission medium, in this case the telephone wire, each symbol is dispersed in time. This dispersion results in intersymbol interference, and limits the rate at which data can be correctly received without taking remedial action.

An equaliser is provided to help reduce intersymbol interference, but the impulse response of one or more filters within the equaliser must be trained, or adapted, to receive data to enable operation over a range of transmission media.

The equaliser is capable of receiving data at each of the possible data rates within the specification. Generally, if the equaliser is trained to equalise data at a higher data rate it will be able to equalise data at a lower data rate. An equaliser trained to equalise data at a lower rate will not be able to equalise data at a higher data rate. However, if an equaliser receives data at a rate lower than that which it is trained (i.e. is overtrained) to equalise it will be able to counteract less intersymbol interference than an equivalent equaliser adapted natively at the lower data rate.

Prior art equalisers are overtrained in the manner hereinbefore described and therefore do not work as well as may be desired for a given complexity.

According to a first aspect of the invention there is provided a network adapter capable of receiving data from a network, said adapter arranged to receive data at at least a lowest and a highest data rate; said adapter comprising:

sampling means arranged to sample said data;

an equaliser arranged to receive, and equalise, said data samples, and said equaliser capable of being trained to equalise data, at at least, each of said lowest and highest data rates; and training means capable of training said equaliser to equalise data;

wherein;

said training means is initially arranged to train said equaliser to receive data at said lowest rate allowing data to be decoded and if upon decoding said adapter determines that said equaliser has been trained to equalise data at the incorrect rate to retrain said equaliser to equalise data at the correct rate.

An advantage of such an adapter is that it can be used to receive data at both the highest and lowest rates and yet can counteract a greater degree of intersymbol interference at the lowest rate.

Preferably, a data buffer is provided within the adapter arranged to receive sampled data from said sampling means. Such a data buffer is advantageous because it allows data to be temporarily stored during training of the equaliser (which may be retraining) and helps to ensure that no data is lost.

It will be appreciated that the sampler must sample data at a high enough rate to allow data received at the highest data rate to be received. In the preferred embodiment, the data buffer is arranged to store data at the highest data rate.

Further, in the preferred embodiment the adapter comprises data down-sampling means arranged to output a selection of the data held in the data buffer to the equaliser. Such an arrangement allows data sampled at the highest rate to be fed to the equaliser when the equaliser is trained to equalise data at the lowest rate.

Preferably, the lowest and highest data rates form part of the series $x^y$, where x and y are integers. Most preferably, x equals two. This is advantageous because it allows the down-sampling means to simply skip samples held within the buffer. For instance, if the highest data rate is twice (e.g. lowest rate x=2, y=1 and highest rate x=2, y=2) the lowest rate then the down-sampling means can simply forward every other data sample to the equaliser. If the highest rate were four times the lowest rate (e.g. lowest rate x=2, y=1 and highest rate x=2, y=3) then the down-sampler would transmit every fourth sample to the equaliser. Therefore, the down-sampling means may be arranged to output a selection of the data therein, by predetermining a constant n, and outputting every $n^{th}$ data sample from the data buffer.

The adapter may further comprise a training sequence store buffer arranged to receive and store training data held within the data received from the network. Such a store is advantageous because it allows the training data to be separated from the data in the data buffer.

Preferably, the training sequence store buffer is arranged to hold the training sequence at least until it has been determined that the equaliser has been trained to receive data at the correct rate. This is advantageous because it means that the training data is readily available should the equaliser need to be retrained.

Conveniently, the training sequence store buffer receives data from the sampling means. This arrangement provides an efficient structure.

A down-sampling means may also be arranged to down sample data samples held within the training sequence store buffer to allow the equaliser to be trained with a selection of the data held in the training sequence store buffer.

The training sequence store down-sampling means may be arranged to skip data samples from the data stored therein. Such an arrangement provides for simple operation of the down-sampling means.

A switching means may be provided arranged to switch the source of the data sent to the equaliser between the data buffer and the training sequence store buffer. Such a switch provides a convenient arrangement for switching the equaliser between training and running.

Preferably, the equaliser is arranged to store coefficients derived from its training and use those coefficients, unchanged, to equalise the remainder of the data sequence. In alternative embodiments, the equaliser may be arranged to modify the coefficients during reception to the data sequence in order to try and improve those coefficients (i.e. continue training the equaliser using actual data).

The adapter may be provided as a card, or interface, suitable for plugging into a computer. In some embodiments the card is suitable for plugging into computers having the architecture known as a PC. Such PC cards may be PCI based, or in other embodiments the adapter may be provided as any of the following: a USB device, a Firewire device, an ISA card, a MODEM riser card (which as will be appreciated by the skilled person is a slot on some motherboards facilitating connection of MODEMs and other devices), a PCMIA card.

The adapter may also be provided as a card, or interface, suitable for connecting to a computer peripheral. In particular the card may be suitable for connecting to a printer. Such a card would allow the peripheral to be used across the network.

According to a second aspect of the invention there is provided a method of training an equaliser to equalise a data sequence, which data sequence may be at one of at least a highest and a lowest data rate, said method comprising;

obtaining a number of data samples by sampling said data sequence;

training said equaliser to receive said data sample at said lowest data rate;

decoding a portion of said data sequence with the trained equaliser to ascertain the correct data rate; and retraining said equaliser if the equaliser has been incorrectly trained.

Preferably, the received data sequence is buffered. This allows the data to be held if the equaliser has been trained to equalise data at the wrong data rate.

The method requires the data to be sampled at a high enough frequency to allow data transmitted at the highest data rate to be received. Preferably, data is held in the buffer at this highest data rate. The method may further comprise selecting appropriate data from the buffer to allow the data sequence to be decoded.

Preferably, the data sequence comprises a header and a body. The data sequence may also comprise a preamble. The method may comprise using training data within the preamble to train the equaliser. Further, the method may comprise decoding information within the header, using the trained equaliser, to ascertain the data rate of the body of the data sequence.

Training data may be held in a second, training sequence store, buffer. This is advantageous because it may make re-training of the equaliser more convenient should this need to take place.

The method may comprise sampling the data sequence at a frequency appropriate to sample the highest data rate and subsequently using only a portion of the samples should the data sequence not be the highest data rate. Such an arrangement is advantageous because any apparatus arranged to perform the sampling is not affected by the change of data rate.

Preferably, the both of the higher and lower data rates are part of the series $x^y$, where x and y are integers. Most preferably, x is two. Such a method is convenient because it provides for a simple method of using only a portion of the data sequence; it is simply necessary to discard a predetermined number of data samples. For instance if the lowest data rate is set to two (x=2, y=1) and the higher data rate is set to four (x=2, y=2), then it is simply necessary to discard every other data sample of the highest data rate to derive the lowest data rate.

Preferably, the method allows transmission of data sequences at two data rates; which may be two and four Mbaud. However, the method could transmit data sequences at any number of data rates.

The method may store received data samples at the highest data rate used by the method. This is advantageous because it allows data transmitted at any of the possible data rates to be reconstructed from the stored data.

Preferably, the equaliser may be trained for each data sequence received. This is advantageous because it allows a different data rate to be used for any sequence transmitted across the network.

Conveniently, the method detects an end of sequence marker within the data sequence and once this is detected returns to a state of waiting to train the equaliser.

In one embodiment the method detects the end of the preamble before enabling inputs to the, or each, buffer for received data samples.

According to a third aspect of the invention there is provided a computer readable medium having stored therein instructions for causing a processing unit to execute the method of the second aspect of the invention.

According to a fourth aspect of the invention there is provided a computer program arranged to cause a data sequence to be received, which data sequence may be at one of at least a highest and a lowest data rate, said program:

obtaining samples of said data sequence;

training an equaliser at said lowest data rate to equalise said samples;

decoding a portion of said data sequence using said trained equaliser; and re-training said equaliser if the equaliser has been incorrectly trained.

There now follows a detailed description of the invention with reference to the accompanying drawings of which:

The network adapter utilising this invention will be described in relation to networking comprising telephone wiring within a home but has wider application. An association, the home phone network alliance (HPNA), exists that comprises a group of companies working together to ensure the adoption of a single networking standard. Specification 2.0 of the HPNA allows for varying data transmission rates using a quadrature amplitude modulation scheme.

The standard set by the HPNA allows electrical devices (for example computing devices such as computers, printers, etc. and entertainment devices such as video recorders, televisions, games consoles, etc.) to be connected to the telephone wiring within a house. To allow this to take place each computing device is provided with a network adapter capable of connecting the device to the wiring.

In the preferred embodiment the adapter is provided with at least a portion being provided in hardware. However, the skilled person will appreciate that an adapter could be realised in software. This description is intended to cover both types.

Figure 1:
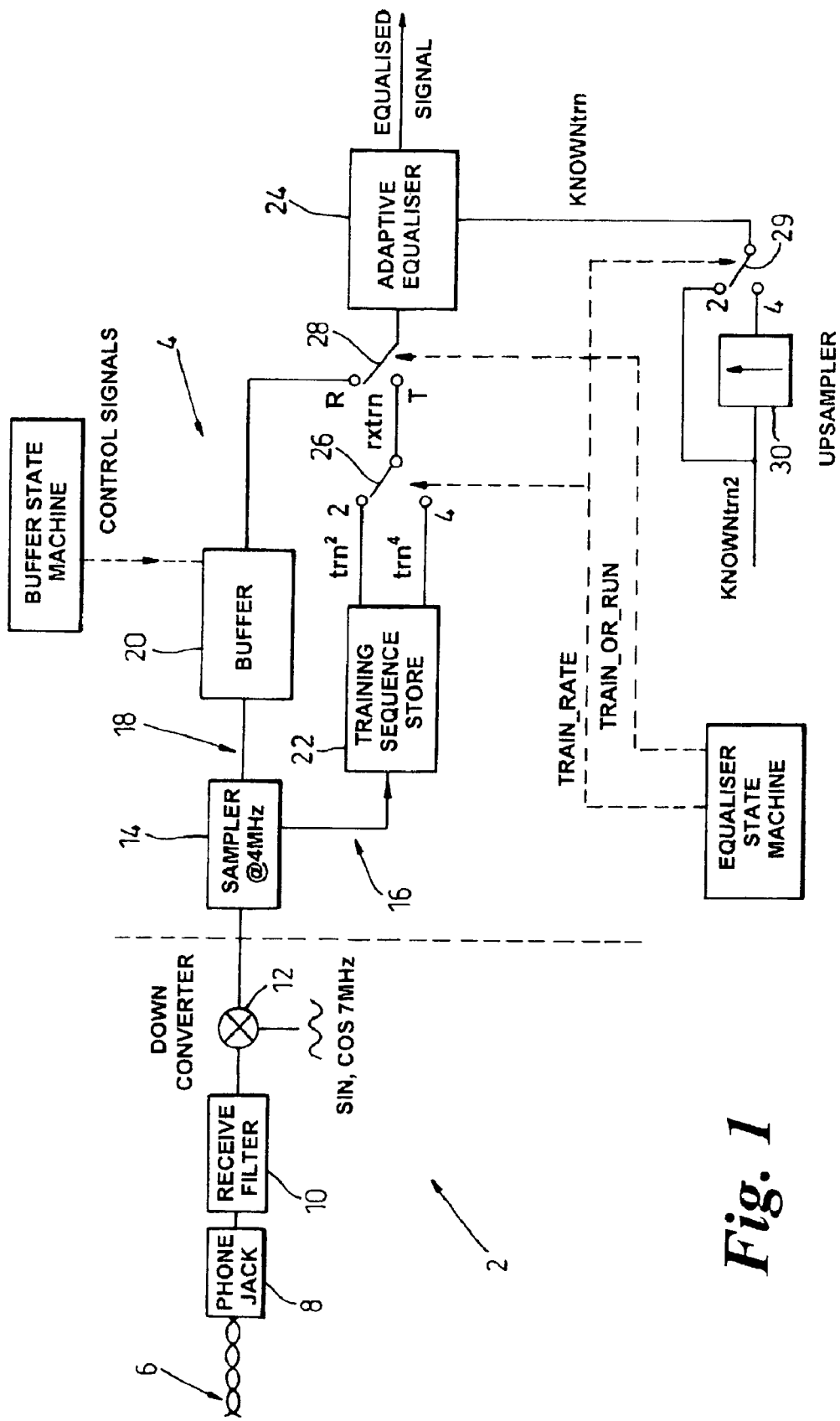
FIG. 1 shows a block diagram for a network adapter utilising the current invention.

A schematic for such an adapter is shown in FIG. 1, which comprises two portions: a generic portion 2 common to any HPNA receiver, and an invention specific portion 4. A telephone wire 6 is shown at a left hand most end of the Figure, which is connected to a telephone jack 8. The signal received from the telephone wire 6 is passed through a receive filter 10, which may remove unwanted noise. The signal is down converted by a down converter 12.

Data sequences transmitted across the telephone wire 6 are made up of a preamble, a header, and a body. The preamble contains training information allowing the receiver to be trained for that data sequence and subsequently to receive and decode the header and body. The header contains the baud rate of the data within the body. However, the equaliser must be trained using the preamble to allow the header to be read to allow the data rate to be determined. The header is always transmitted at the lowest data rate of the specification to ensure that it can be received.

The down conversion may happen in the receive filter, which may have an analogue and a digital part. Following the down conversion a sampler 14 is provided arranged in this case to sample at 4 MHz to convert the analogue signal into digital data.

After the sampler 14 the receiver splits into two paths: a first, training path 16, and a second, decoding path 18. The training path 16 is used to train the receiver appropriately, and the decoding path 18 is used to receive the body of the data once the receiver has been trained.

Figure 3:
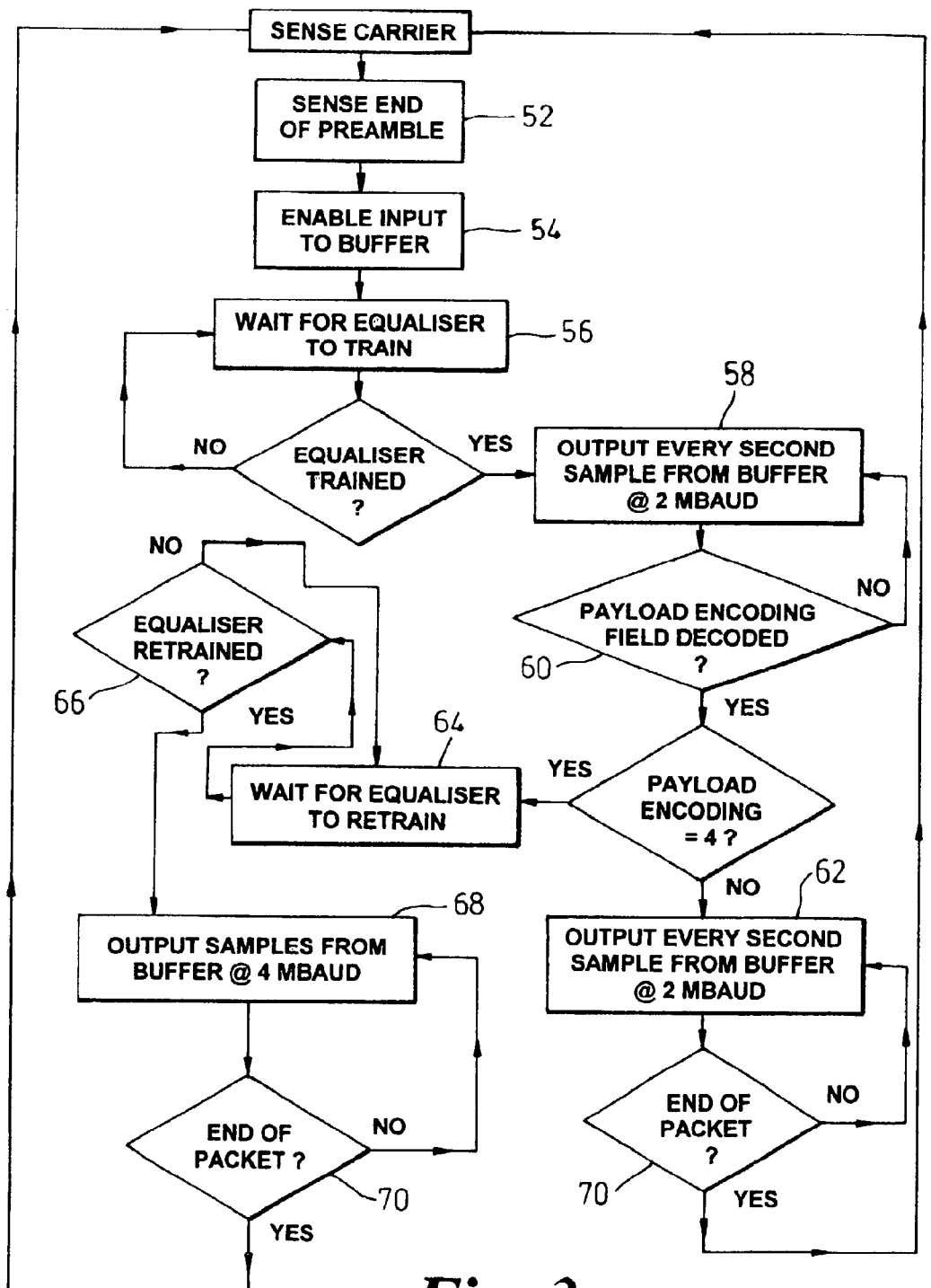
FIG. 3 shows a state machine flow diagram for a buffer of the network adapter.

The decoding path 18 contains a data buffer 20 into which received data is fed, and the data buffer functions according to the state machine diagram shown in FIG. 3.

The training path 16 includes a training sequence store buffer 22 that stores the training sequence received in the preamble of a data sequence. The training sequence store buffer 22 is arranged to be able to output the training sequence received in the preamble at two data rates: 2 Mbaud and 4 Mbaud. The equaliser state machine shown in FIG. 2 controls the selection of the required data rate and subsequent equaliser training.

An adaptive equaliser 24 is provided that contains an adaptive filter, which may comprise a FIR filter. The coefficients for the adaptive filter are trained for each data sequence that is received and the equaliser state machine diagram controls the data that is fed to the equaliser 24.

In FIG. 1 the two switches 26, 28 represent the control of the source of the data that is fed to the equaliser 24. The first of the switches 26 represents the selection that must be made between feeding the equaliser with training sequence data that has been sampled at 2 Mbaud, or 4 Mbaud. The second of the switches 28 represents the selection as to whether data from the training path 16 or the decoding path 18 is fed to the adaptive equaliser 24.

An upsampler 30 is provided to upsample an apriori known training sequence allowing it to be fed to the adaptive equaliser 24 at a higher baud rate than that at which it is stored. A switch 29 is provided on the output of upsampler 30 that determines whether it is the low rate apriori known training sequence or the upsampled sequence that is fed to the equaliser 24. In embodiments where the higher baud rate is twice the lower baud rate a zero is inserted after every sample thereby doubling the baud rate of the apriori known training sequence. The received training sequence that is obtained from the preamble is fed into the equaliser and a comparison the received and apriori known sequences allows the equaliser to be trained, or adapted, to equalise the header and body.

In order to counteract the channel impairments inherent in the telephone wire 6 transmission medium, an equaliser 24 is required. The equaliser 24 counteracts a channel impairment known as intersymbol interference. Intersymbol interference causes energy in one symbol to spread into adjacent symbols. The amount of intersymbol interference that an equaliser 24 can successfully overcome is dependent on the number of taps of an adaptive filter in the equaliser 24. The equaliser 24 adapts its parameters as a function of the channel via an equaliser-training algorithm. This output signal is then passed to a decoder that is not described further.

Figure 2:
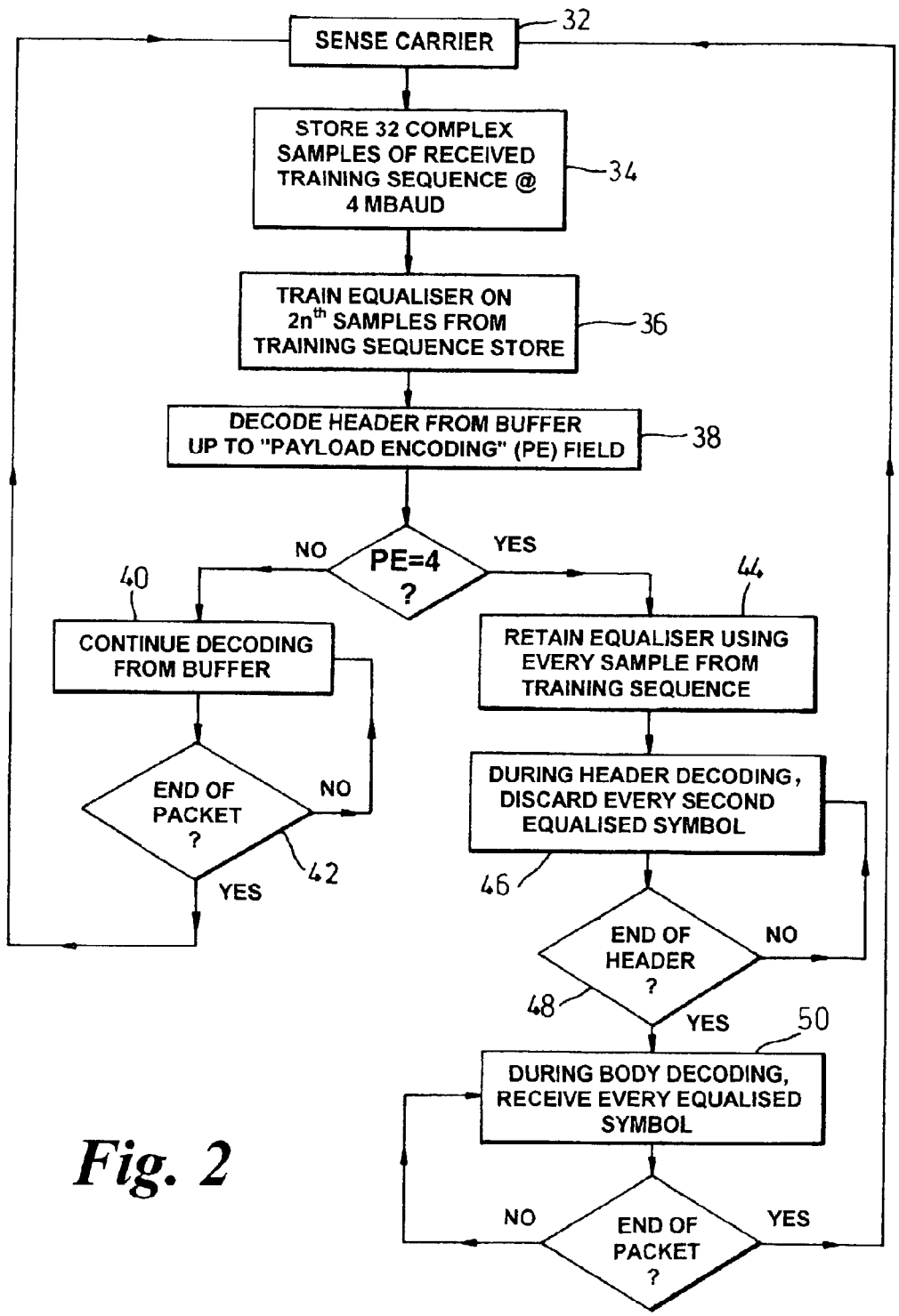
FIG. 2 shows a state machine flow diagram for an equaliser of the network adapter.

As stated hereinbefore the functionality of the training portion of the adapter is controlled by the equaliser state machine as shown in FIG. 2. The adaptive filter within the equaliser is trained for each data sequence that is received. The header of the data sequence is transmitted at the lowest possible data rate to ensure that the data is received and correctly decoded across any line conditions.

After the training information contained in the preamble the header contains a format field, or body encoding field, that defines the modulation format and symbol rate to be used in the rest of the data sequence. However, this format field cannot be read until the equaliser has been trained using the preamble.

In order to adapt the equaliser such that it is fit to equalise a 4 Mbaud symbol stream, the equaliser must be trained in a different manner to the way it would be trained to equalise a 2 Mbaud symbol stream. An equaliser trained for 4 Mbaud can equalise either a 4 Mbaud or a 2 Mbaud stream. An equaliser trained for a 2 Mbaud stream can equalise a 2 Mbaud stream but is unlikely to be able to equalise a 4 Mbaud stream. However, it is beneficial to train the equaliser at the lowest possible baud rate because this increases the level of intersymbol interference that can be tolerated.

For a transmission rate of 2 Mbaud, symbols arrive every 0.5 $\mu$s, and therefore, a four-tap filter can tolerate 2.0 $\mu$s (4×0.5 $\mu$s) of intersymbol interference. At 4 Mbaud this tolerance drops to 1 $\mu$s (4×0.25 $\mu$s). Therefore, it will be apparent that an equaliser trained at 4 Mbaud and used to equalise a 2 Mbaud signal will have half the amount of tolerance to intersymbol interference than if it were trained at 2 Mbaud.

To train the equaliser for a 2 Mbaud sequence, samples of the received preamble spaced at 0.5 $\mu$s intervals are fed into the equaliser training algorithm. The apriori known training sequence is also fed into the equaliser training algorithm at the rate of 2 Mbaud through the switch 29; this known sequence approximately aligns with the received sequence and allows the equaliser to be adapted to correctly equalise the received signal.

To train the equaliser for a sequence that may contain 4 Mbaud data (using the 2 Mbaud preamble), samples of the received preamble spaced at 0.25 microsecond intervals are fed into the equaliser training algorithm. A sequence ("the 4 Mbaud training sequence") is derived by the upsampler 30 from the known training sequence. This derived sequence is fed to the equaliser training algorithm through the switch 29. The 4 Mbaud training sequence consists of 32 symbols whereas the 2 Mbaud training sequence consists of 16 symbols. The 2n-th 4 Mbaud training sequence symbol is the n-th 2 Mbaud training sequence symbol. The 2n+1-th 4 Mbaud training sequence symbol is zero. The 4 Mbaud training sequence approximately aligns with the received sequence.

In the adapter according to the invention, the equaliser is initially trained as though the body of the sequence is at a rate of 2 Mbaud. Thus, as shown in the state diagram of FIG. 2 once a carrier has been detected 32 the preamble is sampled 34 at 4 MHz and 32 samples are stored, in the training sequence store. The switch 26 is set to the trn2 position such that every other sample is sent to the equaliser 36. The switch 28 is set to the "T" position, in which the adaptive filter of the equaliser is trained. The switch 29 is set to position 2 such that the apriori known training sequence is fed to the equaliser 24 at the lower rate.

Once the equaliser has been trained by the training sequence, the switch 28 is moved to the receive position ("R") and the header is decoded 38 up to the field holding the body to determine the baud rate of the body of the data sequence.

If the baud rate of the body is 2 Mbaud then the equaliser has been correctly trained. Thus, the switch 28 is left in the position such that the equaliser receives data from the decoding path 18 and data held in the buffer 20 is decoded 40. Once the end of the data sequence has been reached then the state machine returns 42 to the initial position wherein it is waiting for a carrier signal.

However, if after decoding the header, it transpires that the equaliser has been trained at the wrong baud rate (i.e. 2 Mbaud rather than 4 Mbaud) then the equaliser must be retrained using the thirty two samples in the training sequence store 22. To ensure that incoming data is not lost it is sent into the buffer 20, and the equaliser retrained 44. The switch 26 is set to the position trn4 so that each of the 32 samples is fed into the equaliser allowing it to be trained. Further, the switch 29 is moved to position 4 allowing the upsampled apriori known training sequence to be fed to the equaliser 24.

Once the equaliser has been retrained, the switch 28 is set to the position wherein the equaliser receives data from the decoding path 18, and the remainder of the header is decoded. Because the header is transmitted at 2 Mbaud every other symbol of the header is a zero, and therefore, every other symbol of the header must be discarded 46.

Once the body encoding field within the header is detected 48 every symbol of the body of the data sequence is received and decoded 50, since the body is transmitted at 4 Mbaud. Again, once the end of the sequence is detected the state machine returns to the state wherein it is waiting for a carrier to be detected.

As noted above, when the equaliser is being trained data is fed into the buffer 20 (a FIFO buffer) so that data received whilst training is still occurring is not lost. Once training has finished data within the buffer is decoded. The state machine governing the functionality of the buffer is shown in FIG. 3.

Once the end of the preamble has been detected 52 then incoming data is fed 54 into the buffer 20. It should be noted that the incoming data is sampled at 4 MHz and that therefore, data will be held in the buffer at a resolution as if it were 4 Mbaud.

No data is passed from the buffer into the equaliser 24 until the equaliser 24 has been trained and thus, the state machine loops 56 until training has taken place.

Once training has finished, the header is output to the equaliser 24. As discussed hereinbefore, the header is transmitted at 2 Mbaud, and therefore, every other sample is transmitted 58 to the equaliser enabling it to be decoded.

Once body encoding field (which contains information relating to how the body is encoded) has been decoded 60 the buffer continues to output every other sample 62 if the body of the sequence is transmitted at 2 Mbaud, or waits for the equaliser to retrain 64 if the body is at 4 Mbaud. For a sequence body at 4 Mbaud, once the equaliser has retrained 66 every sample of the body is sent 68 to the equaliser 24.

The buffer then continues to output data until the all the data from the body has been sent to the equaliser, and the end of the body has been detected 70, at which point the state machine returns to waiting for a carrier signal to be received.

Between subsequent data sequences there exists an inter sequence gap that provides extra time for the adapter to flush the buffer before the next data sequence must be received and buffered. Generally, however, the adapter will be able to process the data held in the buffer quicker that it arrives at the adapter.

Although described primarily in relation to networks involving telephone wiring it is applicable to other technologies. It is particularly applicable to transmission media over which the data transfer rate cannot be guaranteed due to the dispersed nature of the channel.

What is claimed is:

1. A network adapter capable of receiving data from a network, said adapter arranged to receive said data at at least a lowest and a highest data rate; said adapter comprising:

sampling means arranged to sample said data and produce data samples;

an equalizer arranged to receive, and equalize, said data samples, and said equalizer capable of being trained to equalize said data, at at least, each of said lowest and highest data rates; and training means capable of training said equalizer to equalize said data;

wherein;

said training means is initially arranged to train said equalizer to receive said data at said lowest data rate allowing data to be decoded and if upon decoding said adapter determines that said equalizer has been trained to equalize data at an incorrect rate to retrain said equalizer to equalize data at a correct rate.

2. An adapter according to claim 1 that is arranged to receive one or more data sequences and is further arranged such that said equalizer is trained for each said data sequence received.

3. An adapter according to claim 1 including a data buffer arranged to receive said data samples from said sampling means.

4. An adapter according to claim 3 wherein said data buffer is arranged to store data at a highest data frequency.

5. An adapter according to claim 1 wherein said adapter also comprises a training sequence store buffer arranged to receive and store a training sequence held within said data.

6. An adapter according to claim 5 wherein said training sequence store buffer is arranged to hold said training sequence at least until it has been determined that said equalizer has been trained to receive said data at said correct rate.

7. An adapter according to claim 5 wherein said training sequence store buffer is arranged to receive data from said sampling means.

8. An adapter according to claim 3 which also comprises a data down-sampling means arranged to output a selection of said data held in said data buffer to said equalizer.

9. An adapter according to claim 5 which also comprises a data down-sampling means arranged to output a selection of said data held in said training sequence store buffer.

10. An adapter according to claim 8 wherein said down-sampling means is arranged to output a selection of said data therein by predetermining a constant n, and outputting every nth data sample from said data buffer.

11. A method of training an equalizer to equalize a data sequence, which said data sequence is at one of at least a highest and a lowest data rate, said method comprising:

obtaining at least one data sample by sampling said data sequence;

training said equalizer to receive said data samples at said lowest data rate to provide a trained equalizer;

decoding a portion of said data sequence with said trained equalizer to ascertain the correct data rate; and retraining said equalizer if said equalizer has been incorrectly trained.

12. A method according to claim 11 wherein said method comprises using training data within a preamble of said data sequence to train said equalizer.

13. A method according to claim 11 wherein said received data sequence is buffered.

14. A method according to claim 13 wherein said data is buffered at said highest data rate.

15. A method according to claim 12 wherein training data is held in a training sequence store buffer.

16. A method according to claim 11 wherein said method comprises sampling said data sequence at said highest data rate and subsequently using only a portion of the samples should said data sequence be at another data rate.

17. A method according to claim 16 wherein said method determines a number n and uses only every nth data sample, in order to use only a portion of said samples.

18. A method according to claim 11 wherein the highest and lowest data rates are part of the series xy, where x and y are integers.

19. A method according to claim 18 wherein x is two.

20. A method according to claim 11 wherein said equalizer is trained for each data sequence received.

21. A method according to claim 11 wherein said method detects an end of sequence marker within said data sequence and once this is detected returns to a state of waiting to train said equalizer.

22. A method according to claim 13 wherein said data sequence comprises a preamble, the end of which is received before buffering of said data samples is enabled.

23. A computer readable medium having stored therein instructions for causing a processing unit to execute the method of claim 11.

24. A computer program arranged to cause a data sequence to be received, which data sequence is at one of at least a highest and a lowest data rate, said program:

obtaining samples of said data sequence;

training an equalizer to equalize said samples to provide a trained equalizer;

decoding a portion of said data sequence using said trained equalizer; and re-training said equalizer if the equalizer has been trained incorrectly at an incorrect data rate.

25. An interface including an adapter according to claim 1.

26. An interface according to claim 25 arranged to interface a computer or computer peripheral to a network.

27. An interface according to claim 25 provided as any of the following: a PCI card, an ISA card, a USB peripheral, a Firewire peripheral, a PCMIA card, a MODEM riser card.

28. A network adapter capable of receiving data from a network, said adapter arranged to receive said data at at least a lowest and a highest data rate; said adapter comprising:

a sampler arranged to sample said data to produce at least one data sample;

an equalizer arranged to receive, and equalize, said at least one data sample, and said equalizer capable of being trained to equalize said data, at at least, each of said lowest and highest data rates; and a trainer capable of training said equalizer to equalize said at least one data sample; wherein said trainer is arranged to initially train said equalizer to receive said data at said lowest data rate allowing said data to be decoded and if upon decoding said data said adapter determines that said equalizer has been trained to equalize said data at an incorrect rate to retain said equalizer to equalize said data at a correct rate.

29. A network adapter capable of receiving data from a network, said adapter arranged to receive a plurality of data sequences each said data sequence containing said data, said adapter arranged to receive said data at at least a lowest and a highest data rate; said adapter comprising:

a sampler arranged to sample said data to produce at least one data sample;

an equalizer arranged to receive and equalize said at least one data sample, and said equalizer being capable of being trained to equalize said data at at least, each of said lowest and highest data rates and said equalizer being arranged to be trained for each data sequence received;

and a trainer capable of training said equalizer to equalize said at least one data sample wherein said trainer is arranged to initially train said equalizer to receive said data at said lowest data rate allowing a portion of said data to be decoded and if, upon decoding said portion of said data, said adapter determines that said equalizer has been trained to equalize said data at an incorrect rate said trainer is arranged to retrain said equalizer to equalize said data at a correct rate.

30. An adapter according to claim 29 which comprises a training sequence store buffer arranged to receive an store a training sequence held within said data.

31. An adapter according to claim 30 wherein said training sequence store buffer is arranged to hold said training sequence at least until it has been determined that said equalizer has been trained to receive said data at said correct rate.

32. An adapter according to claim 31 wherein a data buffer is provided and arranged to buffer said data until is determined that said equalizer has been trained to receive said data at said correct rate.

33. An adapter according to claim 29 wherein said portion of said data comprises a header containing said correct data rate at which said equalizer should be trained.

34. A method of training an equalizer to equalize a plurality of data sequences, which said data sequences is at one of at least a highest and a lowest data rate, said method comprising:

obtaining at least one data sample by sampling said data sequence;

training said equalizer to receive said at least one data sample at said lowest data rate to provide a trained equalizer;

decoding a portion of said data sequence with said trained equalizer to ascertain the correct data rate;

retraining said equalizer if said equalizer has been incorrectly trained; and restarting the training process once a data sequence has been completely received to allow the next data sequence to be received.

35. A method according to claim 34 wherein said portion of said data sequence comprises a header containing said data rate at which said equalizer should be trained.

* * * * *

UNITED STATES PATENT AND TRADEMARK OFFICE
CERTIFICATE OF CORRECTION

| | | |
|---|---|---|
| PATENT NO. | : 6,947,480 B2 | Page 1 of 1 |
| APPLICATION NO. | : 10/030041 | |
| DATED | : September 20, 2005 | |
| INVENTOR(S) | : Beale et al. | |

It is certified that error appears in the above-identified patent and that said Letters Patent is hereby corrected as shown below:

In Column 1, Line 46, delete "wherein;" and insert -- wherein: --, therefor.

In Column 3, Line 4, delete "comprising;" and insert -- comprising: --, therefor.

In Column 8, Line 3, in Claim 1, delete "wherein;" and insert -- wherein: --, therefor.

In Column 9, Line 2, in Claim 18, delete "xy," and insert -- $x^y$, --, therefor.

Signed and Sealed this
Eighteenth Day of December, 2012

David J. Kappos
*Director of the United States Patent and Trademark Office*